United States Patent

Tuunanen et al.

[11] Patent Number: 5,160,378
[45] Date of Patent: Nov. 3, 1992

[54] WASHING DEVICE

[75] Inventors: Jukka Tuunanen; Ale Narvanen, both of Helsinki, Finland; Mario Geysen, Clayton, Australia

[73] Assignee: Labsystems Oy, Helsinki, Finland

[21] Appl. No.: 585,912

[22] Filed: Sep. 21, 1990

[30] Foreign Application Priority Data

Sep. 25, 1989 [FI] Finland ............................ 894522

[51] Int. Cl.⁵ ................................ B08B 3/04
[52] U.S. Cl. ........................... 134/25.1; 134/34; 134/118; 134/102.2; 134/140; 134/187
[58] Field of Search ............... 134/86, 89, 98, 102, 134/118, 137, 140, 182, 84, 92, 88, 183, 25.1, 25.4, 25.5, 191, 186, 34, 187; 366/239; 422/300, 301; 118/401, 404, 421, 423; 15/88, 88.1, 104.04, 104.92

[56] References Cited

U.S. PATENT DOCUMENTS

| | | | |
|---|---|---|---|
| 2,811,975 | 11/1957 | Tatibana | 134/171 X |
| 2,827,063 | 3/1958 | Roy | 134/171 |
| 2,877,777 | 3/1957 | Walter | 134/171 X |
| 3,478,666 | 11/1967 | Bishop | 134/118 |
| 3,593,729 | 7/1971 | Goldware | 134/113 X |
| 3,657,990 | 4/1972 | Wilhelm | 134/102 |
| 3,900,339 | 8/1975 | Filipin et al. | 134/25.4 |
| 4,130,444 | 12/1978 | Anderka | 134/98 |
| 4,167,341 | 9/1979 | Doyel | 134/118 X |
| 4,299,244 | 10/1981 | Hirai | 134/102 |
| 4,702,266 | 10/1987 | Chu | 134/92 X |
| 4,730,631 | 3/1988 | Schwartz | 134/182 X |

FOREIGN PATENT DOCUMENTS

| | | | |
|---|---|---|---|
| 3045199 | 7/1982 | Fed. Rep. of Germany . | |
| 819221 | 5/1981 | Japan | 134/182 |
| 1572596 | 12/1975 | United Kingdom . | |
| 1588810 | 9/1977 | United Kingdom . | |

*Primary Examiner*—Frankie L. Stinson
*Attorney, Agent, or Firm*—Volpe and Koenig

[57] ABSTRACT

The invention concerns a washing device for treatment of rods attached to a plate with a solution. According to the invention the rods (6) are placed in ducts (4) through which the solution is passed. The invention can be used in particular in peptide syntheses and in immunological assay methods.

15 Claims, 3 Drawing Sheets

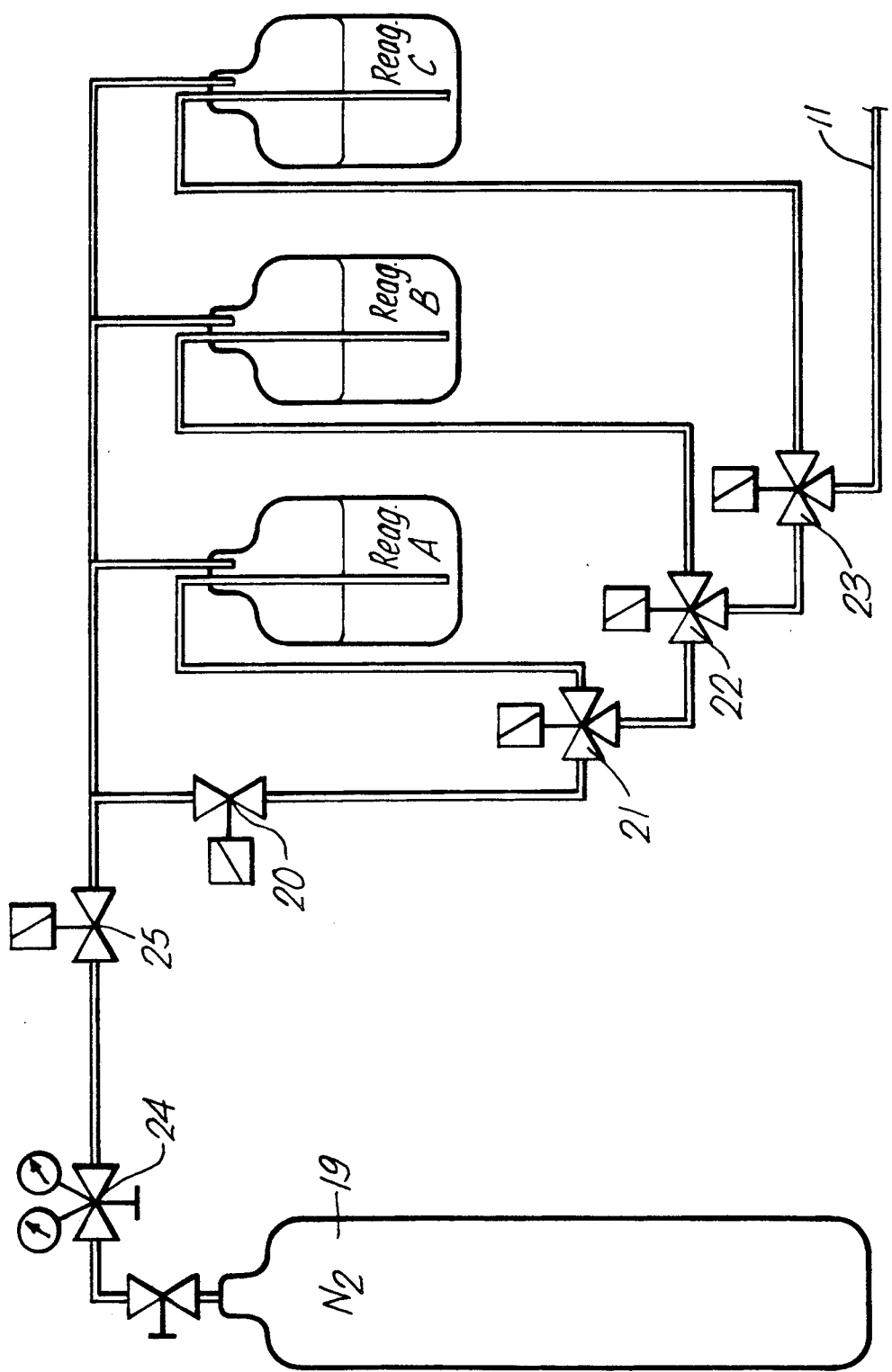

WASHING DEVICE

The invention concerns an apparatus and a method by means of which rods attached to a plate can be washed with liquids, such as washing buffers or organic solvents, or by means of which chemical or biochemical reagents can be allowed to act upon the rods. The invention is suitable for use, e.g., in peptide syntheses and immunological assay methods.

It is known in prior art to synthesize peptides so that a first amino acid is covalently bound onto a solid face, whereupon a second amino acid is reacted with the first amino acid to form a peptide bond. This is continued until the desired peptide has been obtained. This process is described, e.g., in the paper by Merrifield, R., *J. Am. Chem. Soc.* 85:2149-2154 (1963).

Methods have been developed wherein a peptide is synthesized on heads of polyethylene rods attached to a plate. Thereby, certain steps in the synthesis, such as removal of the protection groups and washings, are carried out by washing the heads of the rods in basins that contain a reagent or a washing solution.

The rods with the peptides bound on them can be used directly, e.g., in immunological assay methods. In such cases as well, washing in a basin is used. The molecules bound on the peptides are also removed by washing the rods in basins.

One drawback of the arrangement described above is high consumption of expensive reagents.

Thus, the object of the present invention is to lower the consumption of these reagents and thereby to lower the costs.

The object of the invention is achieved by the means stated in the patent claims.

It is an essential feature of the invention that the rod to be washed is placed in a duct, and washing or reaction liquid is passed through the duct. The liquid is optimally passed in the ducts back and forth during the washing.

According to one embodiment, the apparatus is connected with a valve arrangement by whose means mixing together of washing liquids or liquid-reaction fluids to be measured one after the other is prevented.

In the drawings related to a particular part of the specification,

FIG. 3 is a schematical illustration of a reagent system usable in connection with the washer.

According to the invention, the plastic rods attached to the plate are treated with solutions. The rods are attached to the plate, e.g., in a matrix corresponding to an ordinary 8×12 microtitration plate.

The washer comprises ducts, into which the heads of the rods are placed. At least at the locations of the rods, the ducts are somewhat wider than the thickness of the rods in order that the washing liquid could flow and by-pass the rods. The spacing, number, and length of the ducts naturally depend on the type of the plate that is used, on the number of plates, and on the way in which the plates are to be placed in the apparatus.

The solutions are passed into the ducts preferably through a common distribution space. In a corresponding way, at the other end of the ducts, there is preferably a common space of removal. The liquid is measured into the distribution space, from which it is carried through the ducts into the space of removal.

From the space of removal, if desired, the liquid may be recirculated into the distribution space. The solution is, however, optimally passed through the ducts back and forth between the distribution space and the space of removal until the solution has acted upon the rods for the desired period of time.

To intensify the washing, facing the rods, the ducts may be provided with members that produce turbulence.

If desired, ducts may be interconnected by means of transverse ducts.

The operation of the apparatus is optimally controlled by means of a computer.

The basin may be provided with a detector for monitoring the level of washing liquid, whereby the washing process can be controlled by means of the signals given by said monitoring detector.

By means of the invention, the quantity of solution needed for washing can be reduced considerably as compared with a conventional washing in a basin. As a further advantage, a washing of maximal uniformity of all rods is obtained as the flow conditions for each of the rods are identical. Moreover, by means of increased flow rate and turbulence, the washing time can be made shorter or the result can be improved.

Figure 1:
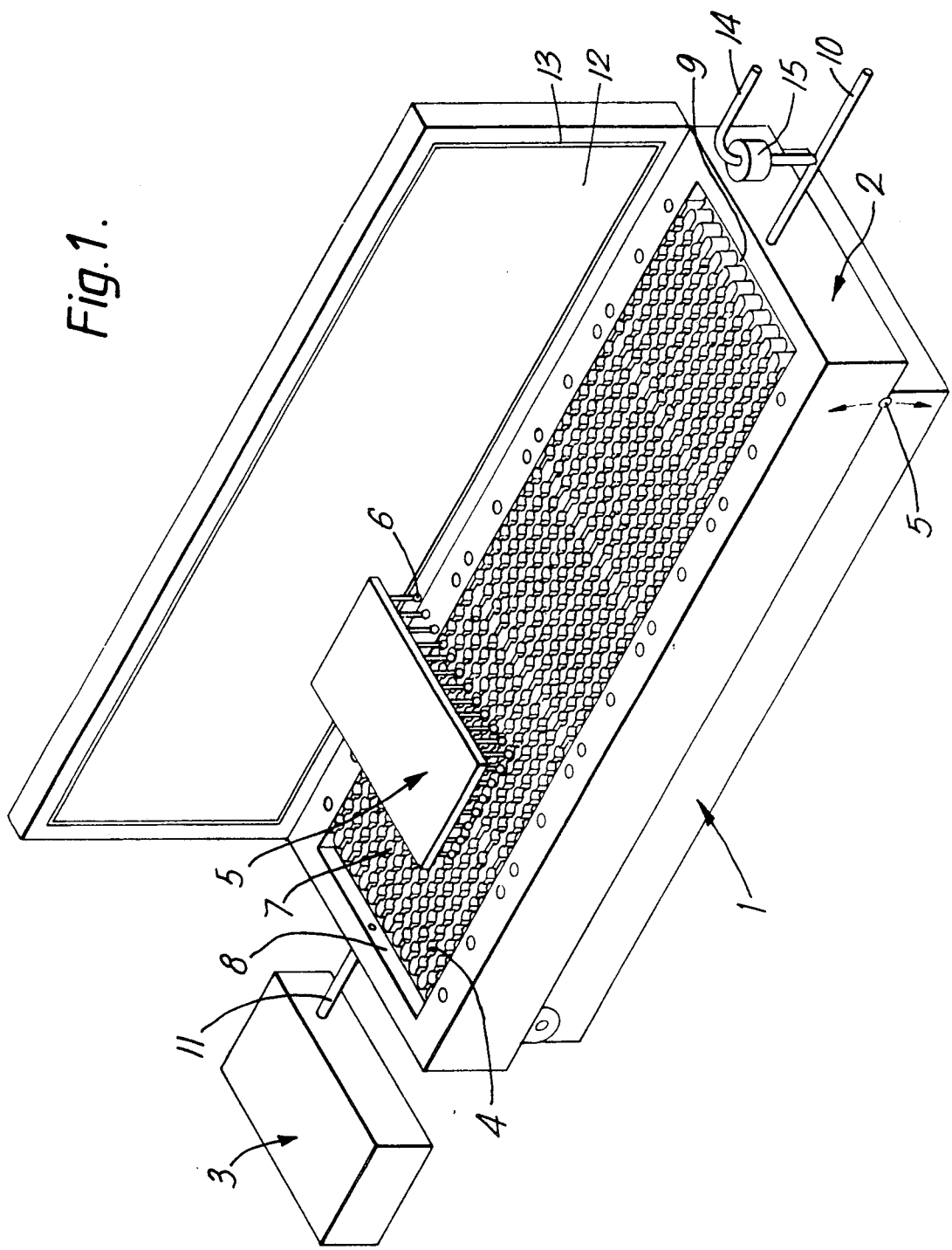
FIG. 1 is a perspective view of a washer and of a rod plate as seen from above.

The main parts of the apparatus shown in FIG. 1 are the base 1, the washing basin 2, and the reagent system 3.

The washing basin comprises twelve washing ducts 4. Into the basin, five plates 5 can be placed for treatment at a time, each plate comprising 8×12 rods 6.

The ducts 4 are provided with a washing well 7 for each rod, the diameter of said well being somewhat larger than the diameter of the rod 6. Between the wells, the ducts are narrower than the rods. In this way the amount of solution required for filling the duct can be made little. The washing wells also produce turbulence, thereby improving the washing of the rods.

At the initial ends of the ducts 4 there is a common distribution space 8, from which the solution flows into the ducts. On the other hand, at the final ends of the ducts there is a common space of removal 9, from which the spent liquid can be removed through the pipe 10. The solution is passed into the distribution space 8 from the reagent system through the inlet pipe 11.

The washing basin can be closed by means of a lid 12. The edge of the lid is provided with a seal 13. In this way the washing space can be closed air-tightly and, if necessary, the washing can be carried out, e.g., in an inert gas phase.

The washing basin is attached to the base by the intermediate of a motion mechanism 5. By means of the motion mechanism the inclination of the basin in the longitudinal direction of the ducts can be changed, whereby the solution is made to flow in the ducts back and forth. In the device shown in the figure the washing basin is hinged on the base at the initial end of the ducts, but of course it is also possible to use arrangements of other sorts to incline the ducts.

To the exhaust pipe 10 of the basin, a vertical side branch 14 is connected, which is provided with a level sensor 15. During washing, the exhaust pipe is closed, whereby the liquid level in the side branch is at the same level as in the basin. In the first stage of washing, the final end of the basin is lowered, whereby the solution flows to the exhaust end and the level in the side branch ...s. When the liquid surface has reached a certain level, the sensor gives a signal for reversing of the direction of inclination. In a corresponding way, when the liquid level is lowered to a certain level, the direction of inclination is reversed. After the desired time of washing or the desired number of inclinations the solution is removed out of the basin.

Figure 2:
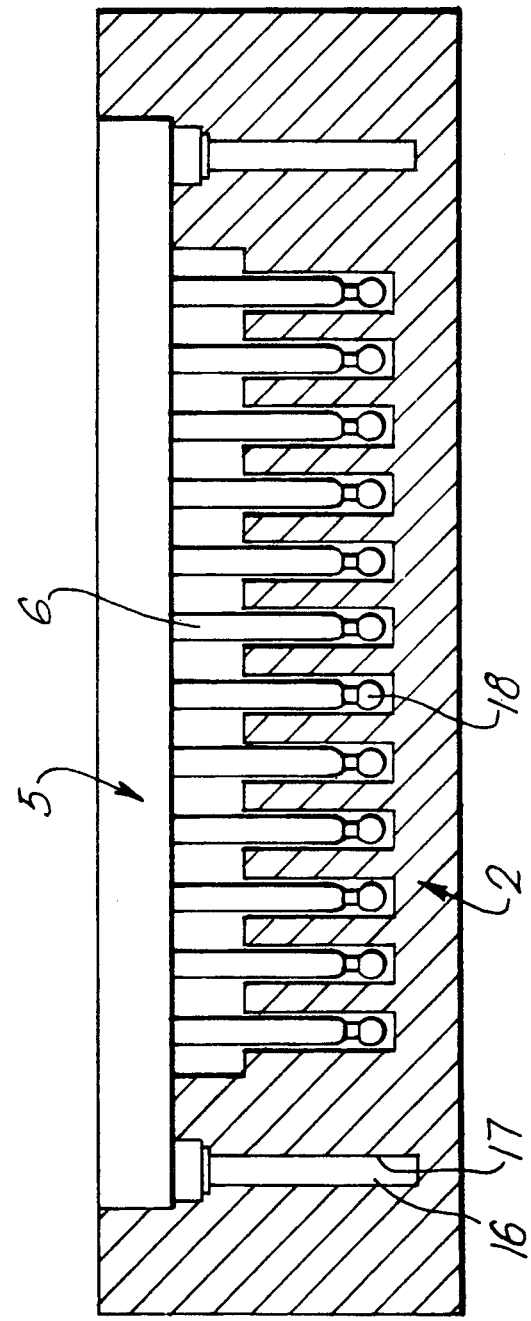
FIG. 2 is a sectional view of a basin and of a plate fitted in same.

Moreover, in the arrangement shown in FIG. 2, the guide rods 16 placed at the ends of the plates are seen, which fit into the recesses 17 provided in the basin. The guide rods support the plate so that the heads 18 of the rods 6 do not reach contact with the well bottoms. The guide rods also prevent movements of the plate during the inclinations.

FIG. 3 shows a reagent system for use, e.g., in a peptide synthesis, wherein the reagents A, B and C can be passed by means of the pressure of an inert gas 19 (herein nitrogen) into the inlet pipe 11 of the washing basin.

At the end of the inlet pipe 11 there is a valve 20, through which gas alone may be passed into the inlet pipe. Next, in the inlet pipe, there is a three-way valve 21, through which gas flows in the pipe, or a solution coming from the valve 26 flows in the pipe, or the reagent A is passed into the pipe. In a corresponding way, through the three-way valves 22 and 23, gas can be passed from the preceding valve, or the reagent B or C, respectively. In a corresponding way, it is, of course, also possible to connect a higher number of reagent flasks to the system. If necessary, the whole inlet pipe can be cleared of reagents by means of gas. By means of this arrangement, it is possible to supply the reagent that is required at each particular time into the inlet pipe without mixing it at all with other reagents that might remain in the pipe system The gas pressure and so also the dosage rate of the reagents can be regulated by means of a pressure reduction valve 24. The arrangement further includes a closing valve 25.

In a peptide synthesis it is possible to use amino acids protected with F-moc (9-fluorenylmethyloxycarbonyl) protection groups as a starting material. When the apparatus in accordance with the invention is used, the following washing procedure is carried out at the beginning of each synthesis cycle.

1 × 130 ml of DMF (dimethylformamide), 5 min shaking
4 × 130 ml of methanol, 2 min shaking
1 × 130 ml of DMF, 5 min shaking
1 × 90 ml of 20% piperidine in DMF, 30 min
2 × 130 ml of DMF, 5 min shaking
4 130 ml of methanol, 2 min shaking
nitrogen drying, 15 min
2 × 130 ml of DMF, 5 min shaking.

After the synthesis is completed, the amino terminals can be acetylated, the following procedure being used:
90 ml of DMF:acetic anhydride:diisopropylethylamine (v/v/v=50:5:1), 90 min shaking
1 × 130 ml of DMF, 2 min shaking
4 × 130 ml of methanol, 2 min shaking
nitrogen drying, 15 min.

For removal of the side chain protection groups the following procedure is employed:
90 ml of TFA:phenol:ethanedithiol (v/v/v=95:2.5:2.5), 4 hours
2 × 130 ml of 5% diisopropylethylamine/dichlormethane, 5 min shaking
nitrogen drying, 15 min
2 × 130 ml of distilled water, 5 min shaking.

Finally the rods are kept in a methanol bath for 18 h.

The peptide derived from the viral proteins can be used for the assay of corresponding anti-virus antibodies by means of EIA. Thereby, e.g., the following washing procedure is employed:
90 ml of diluted antiserum, 4 hours shaking
8 × 130 ml of washing buffer
90 ml of alkaline phosphatase conjugated anti-Ig, 2 hours shaking
8 × 130 ml of washing buffer, 5 min shaking.

Finally the rods are subjected to the substrate in a microtitration plate, and the measurement is performed.

When proteins bound to peptide are removed, the following procedure can be used:
6 × 90 ml of disruption buffer, 10 min shaking
4 × 130 ml of distilled water, 10 min shaking
4 × 130 ml of methanol, 10 min shaking
4 × 130 ml of distilled water, 10 min shaking.

What is claimed is:

1. Washing device for washing of rods attached to a plate in rows by means of a cleaning or reagent solution, characterized in that the washer comprises
a washing basin provided with a duct (4) for each row of rods, into which said duct the row of rods can be placed so that washing solution can be passed past the row of rods in the duct,
means for passing the washing solution into the ducts, as well as
means for removing the washing solution from the ducts.

2. Device as claimed in claim 1, characterized in that in the ducts, facing the rods, means (7) are provided for producing of turbulence or for intensification of same in the flow of the washing solution in the area of the rods.

3. Device as claimed in claim 2, characterized in that the ducts consist of holes (7) of a cross-section somewhat larger than the rods and of connecting narrower portions of ducts.

4. Device as claimed in claim 1, characterized in that it includes means for recirculation of the washing solution or for passing the solution back and forth through the ducts.

5. Device as claimed in claim 4, characterized in that it includes means (5) for inclining the basin back and forth in the longitudinal direction of the ducts.

6. Device as claimed in claim 5, characterized in that it includes means (5) for reversing the direction of inclination in accordance with the surface level.

7. Device as claimed in claim 1, characterized in that it includes a sensor (15) for monitoring the surface level of the washing liquid.

8. Device as claimed in claim 1, characterized in that the basin can be closed air-tightly by means of a lid (12) and that the device includes means for producing an inert gas phase in the basin.

9. Device as claimed in claim 1, characterized in that, for the purpose of passing the washing solution into the ducts, the device is provided with an inlet duct (11) and therein with a first three-way valve (18), one of whose branches communicates with a first washing-solution tank, whereas a second branch communicates through a closing valve (17) with a tank that contains inert gas or liquid for the purpose of cleaning of the inlet duct.

10. Device as claimed in claim 9, characterized in that the inlet pipe is further provided with a second three-way valve (19), one of whose branches communicates with the first three-way valve (18), whereas a second branch communicates with a second tank of washing liquid.

11. Device as claimed in claim 9, characterized in that pressurized gas is used both for passing the washing solution and for cleaning the inlet duct.

12. Device as claimed in claim 1, characterized in that it includes means (16) for passing the washing solution into the ducts, said means operating by means of pressurized gas.

13. Device as claimed in claim 1, characterized in that it is provided with guide means (16,17) for keeping the plate in its correct position in the basin.

14. Method for washing of rods attached to a plate in rows with a solution, characterized in that the plate is placed in a basin which comprises a duct for each row of rods and that washing solution is passed through the duct so that it washingly flows by the rods.

15. Washing device for washing of rods attached to a plate in a plurality of rows by means of a cleaning or reagent solution, characterized in that the washer comprises:

a washing basin provided with plurality of ducts, one for each row of rods, into which the rows of rods can be placed so that washing solution can be passed through the ducts to clean rows of rods when placed therein, means for passing the washing solution into the ducts, and means for removing the washing solution from the ducts.

* * * * *